United States Patent
Newton et al.

(10) Patent No.: US 6,857,829 B2
(45) Date of Patent: Feb. 22, 2005

(54) DRILL PRESS TABLE ACCESSORY

(75) Inventors: William W. Newton, Brooks, KY (US); Gregory A. Phillips, Lagrange, KY (US); W. Miles Hale, Louisville, KY (US)

(73) Assignee: Credo Technology Corporation, Wilmington, DE (US)

( * ) Notice: Subject to any disclaimer, the term of this patent is extended or adjusted under 35 U.S.C. 154(b) by 431 days.

(21) Appl. No.: 10/165,942

(22) Filed: Jun. 10, 2002

(65) Prior Publication Data

US 2003/0228198 A1 Dec. 11, 2003

(51) Int. Cl.[7] .............................................. B23B 39/00
(52) U.S. Cl. ........................ 408/89; 408/67; 409/224
(58) Field of Search ........................... 408/67, 76, 89, 408/103, 108, 109, 234; 409/221, 224; 33/638, 642; 269/21, 303, 309; 144/92, 96, 252.1

(56) References Cited

U.S. PATENT DOCUMENTS

| | | | | |
|---|---|---|---|---|
| 359,270 A | * | 3/1887 | McNeal ....................... 408/89 |
| 1,755,400 A | * | 4/1930 | Knight ......................... 408/89 |
| 1,895,106 A | * | 1/1933 | Russ ........................ 144/278.2 |
| 2,471,940 A | | 5/1949 | Dion |
| 2,891,452 A | * | 6/1959 | Ostler et al. ................. 409/168 |
| 2,923,179 A | * | 2/1960 | Pierce .......................... 269/84 |
| 3,359,836 A | | 12/1967 | Jalava |
| 4,140,308 A | | 2/1979 | Disston, Jr. et al. ....... 269/87.3 |
| 4,466,601 A | | 8/1984 | Raines .......................... 269/79 |
| 4,842,453 A | | 6/1989 | Raines et al. ................. 408/89 |
| 5,337,641 A | | 8/1994 | Duginske ..................... 83/468 |
| 5,562,135 A | * | 10/1996 | Beth et al. ................... 144/1.1 |
| 5,634,748 A | | 6/1997 | Brazell et al. ................ 408/89 |
| 5,765,273 A | | 6/1998 | Mora et al. ................... 29/550 |
| 5,768,996 A | | 6/1998 | Ackley ....................... 101/483 |
| 5,769,575 A | * | 6/1998 | Stofflet et al. ............... 408/17 |
| 5,924,827 A | | 7/1999 | Mora et al. ................... 408/87 |
| 5,980,167 A | | 11/1999 | Chen ............................ 408/87 |
| D440,989 S | * | 4/2001 | Krohmer ................... D15/141 |
| D441,773 S | * | 5/2001 | Krohmer ................... D15/141 |
| 6,494,649 B2 | * | 12/2002 | Queipo ......................... 408/27 |
| 6,775,917 B1 | * | 8/2004 | Campbell ..................... 33/640 |
| 2002/0094248 A1 | * | 7/2002 | Smith .......................... 408/87 |

OTHER PUBLICATIONS

"A Drill Press Jig with all the Angles," by Bill Lahay, Wood Magazine, p. 60, Feb. 2000.
"Jigs for the Drill Press," by Gary Rogowski, Fine Woodworking Magazine, p. 72, Jan./Feb. 2000.
"Cabinet Making and Millwork," by John L. Feirer, Glencoe Publishing Company, pp. 425–426, 1982.

* cited by examiner

Primary Examiner—Daniel W. Howell
(74) Attorney, Agent, or Firm—Greer, Burns & Crain, Ltd.

(57) ABSTRACT

One embodiment of a drill press table accessory has a work surface with an opening therethrough for passing at least a portion of a drill bit. A vacuum channel communicates with the opening and with a vacuum port for connection to a vacuum source. In operation, a pressure differential may be communicated from the vacuum source to the opening to remove dust and debris as a work piece is operated on. An additional drill press table embodiment has upper and lower tables hingedly attached whereby the upper table may be oriented at an angle to the lower table so that a work piece can be operated on at an angle.

20 Claims, 5 Drawing Sheets

US 6,857,829 B2

DRILL PRESS TABLE ACCESSORY

FIELD OF THE INVENTION

The present invention is related to drill presses and drill press table accessories for holding a work piece for drilling.

BACKGROUND OF THE INVENTION

Drill presses generally comprise a vertical post for supporting a vertically movable drill chuck, and a horizontal table arranged between the top and the bottom of the vertical post for holding a work piece. In operation a bit is held by the chuck and may be raised or lowered in relation to the table to drill a hole in a work piece held on the table. The drill press table may provide means for holding the work piece such as a clamp. A fence may also be provided to limit the movement of the work piece on the table in a given direction. Also, the table may be movable in relation to the drill chuck along one or more axis so that the work piece can be operated on at different positions without requiring removal of the piece from the table holding means. Although drill press tables are known in the art, a number of unresolved problems remain.

For example, work pieces may not fit conveniently on the table, and may not easily be held on the table. This is particularly true for irregularly shaped or large work pieces. Also, it may be desirable to drill a work piece at an angle. While the prior art includes proposals for tables that include means for holding a work piece at an angle relative to the chuck, these proposals tend to be complex, costly to manufacture, and difficult to use.

Still additional problems in the art relate to dust and debris created during operation of a drill press. As a metal or wood work piece is drilled, wood or metal debris can accumulate on the work piece, the table, the floor, and be dispersed in the air. Presence of debris is disadvantageous for many reasons. It can hinder operation of the drill or other machinery in the area. Also, the air born dust can be a health hazard. To minimize these disadvantageous conditions, use of drill presses may require frequent cleaning of the table and area to remove dust, as well as frequent lubrication and servicing of the drill.

SUMMARY OF THE INVENTION

An embodiment of the present invention is directed to a drill press table accessory for holding a work piece for drilling. A drill press table accessory embodiment of the invention comprises a work surface for holding the work piece, an opening through the work surface for passing at least a portion of a drill bit, and a vacuum channel communicating with the opening for connection to a vacuum source for vacuuming debris from the opening. In an additional drill press table accessory embodiment of the invention, a drill press table comprises an upper and a lower table pivotally joined by a hinge, so that the held work piece may be drilled at an angle.

Embodiments of the present invention solve many otherwise unresolved problems in the art. For example, a vacuum channel allows for dust and debris created during operation of a drill to be vacuumed close to its origination, thereby minimizing dispersal of the dust and debris. In operation, the vacuum pressure delivered through the vacuum channel has been discovered to beneficially contribute to holding the work piece in place. Also, invention embodiments that comprise a pivotally adjustable work surface provide for an easy to use table with angled drilling capabilities.

DETAILED DESCRIPTION

Figure 1:
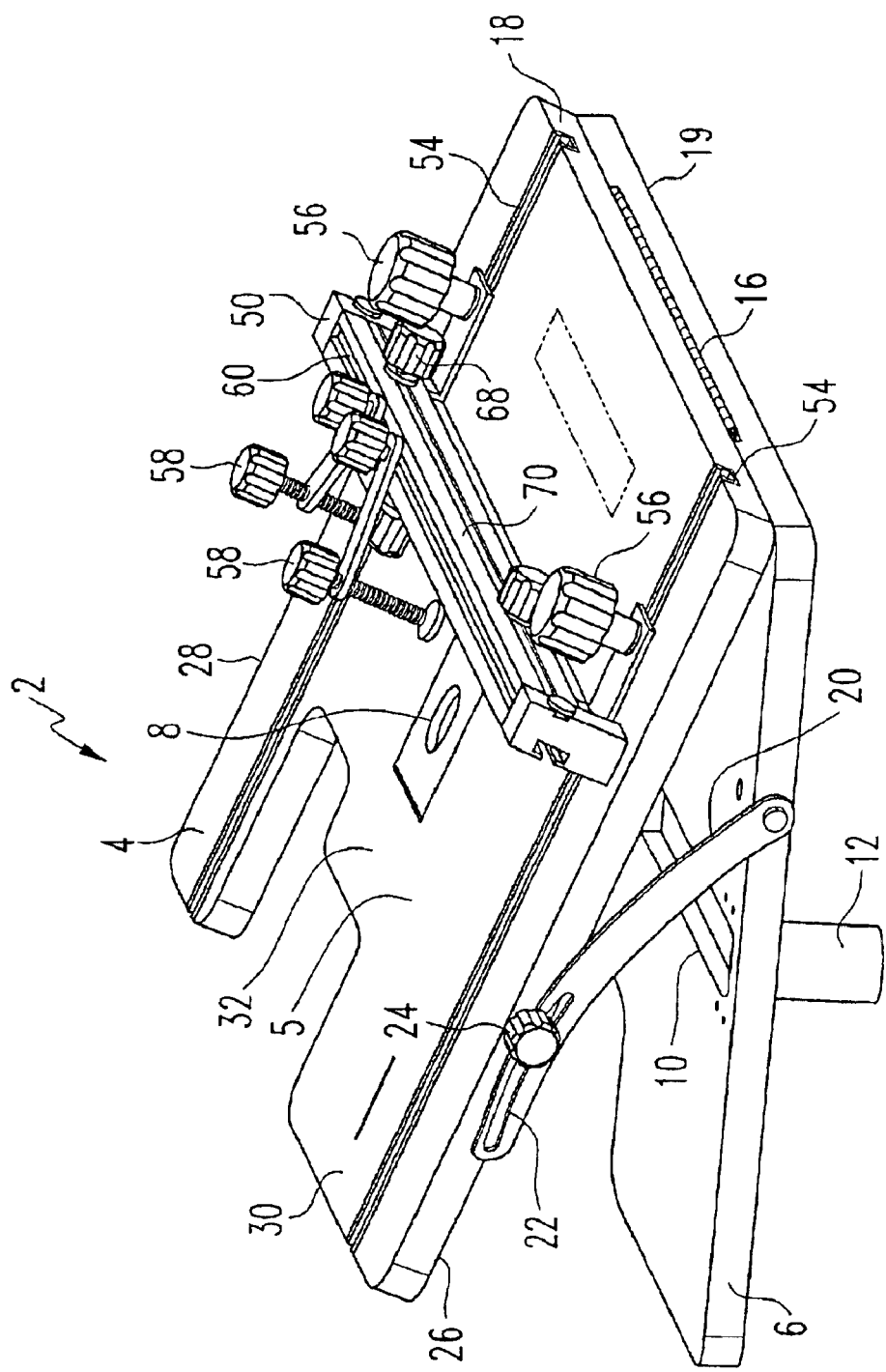
FIG. 1 is a perspective view of a first embodiment of the present invention.

Turning now to the drawings, a first embodiment of a drill press table accessory is shown in FIGS. 1–4. As will be appreciated by those knowledgeable in the art, the drill press table accessory 2 is for holding a work piece for operation on by a drill press. The table accessory 2 generally comprises an upper table 4 and a lower table 6, with the upper table 4 having a work surface 5 for holding the work piece. The work surface 5 may have markings, such as units of length, at various locations. The upper and lower tables 4 and 6 each have an opening 8 and 8', respectively, for passing at least a portion of a drill bit as the drill bit is lowered and penetrates a work piece held on the work surface 5. The openings 8 and 8' are substantially coextensive with one another when the upper table 4 is in place on top of the lower table 6.

The lower table 6 has a vacuum channel 10 preferably formed in its top surface with a first end terminating in the opening 8', and a second end terminating in a vacuum port 12. It will be understood that the channel 10 will be essentially closed when the upper table 4 is flat against the lower table 6. Access to the channel 10 is desirable to allow for inspection and cleaning of the channel 10, and is achieved when the upper table 4 is pivotally removed from the lower table 4. The vacuum port 12 extends from the bottom surface 14 of the lower table 6, and is for connection to a vacuum source. The port 12 preferably comprises a cylindrical, tube-like shape for convenient connection to a vacuum source such as the flexible hose from a shop vac hose, or the like.

In operation, the vacuum channel 10 communicates a pressure differential from a vacuum source connected to the port 12 to the openings 8' and 8 to remove dust and debris from the area. Also, the vacuum source may likewise draw dust and debris from the upper table work surface 5 when a work piece is not completely covering the top of the opening 8. For example, a user may find it useful to sweep or otherwise direct dust from the work surface 5 into the opening 8 for vacuuming. It has also been discovered that the vacuum channel 10 in operation helps to hold a work piece in place on the upper table work surface 5. The vacuum channel 10 thereby provides a useful advantage for invention embodiments, as the dispersal of dust and debris during operation of a drill is thereby reduced and the ability to hold a work piece in place is increased.

It will be appreciated that other invention embodiments may have different vacuum channel configurations than the channel 10. For example, additional vacuum outlets may be provided for communicating vacuum from the channel to the work surface at a plurality of locations. By way of example, a plurality of small openings may extend vertically through the upper table to communicate with the vacuum channel. These openings could be useful for vacuuming debris as well as for providing holding power for holding a work piece. The vacuum channel may also have a plurality of inlets communicating with the opening for higher efficiency vacuuming of the opening. Further, vacuum channels of the invention are not limited to being defined between an upper and lower table, but may likewise comprise, for example, a channel bored through a single table. Accordingly, it will be appreciated that as used herein the term "vacuum channel" is intended to be broadly interpreted as a channel for communicating a pressure differential.

In the table accessory 2, the upper table 4 and the lower table 6 are pivotally connected to one another by a hinge 16 along a front edge 18 and 18' of the upper and lower tables 4 and 6, respectively. It will be understood that the hinge 16 may be located along another edge of the upper and lower tables 4 and 6. The front edges 18 and 19 are preferred, however, as it is along these edges that a user is generally located when using the drill press table 2. The upwardly sloped upper table 4 may be easily viewed from the front edge 18. A hinge 16 located at the front edges 18 and 19 also allows for upward slanting of the upper table 4 without interference from the vertical column of a drill press.

An angle brace 20 is pivotally connected to the each lateral side of the lower table 6, with each brace 20 having a locking slot 22 for engaging a locking member 24 connected to the upper table 4. A preferred locking member 24 comprises a threaded locking bolt that can be tightened to frictionally engage the locking slot 22 to hold the angle brace 20 in position at a desired angle relative to the lower table 6. In this manner the upper table 4 and its work surface 5 may be oriented at a desired angle in order to hold a work piece at an angle for drilling. The angle brace 20, its locking slot 22, and the locking bolt 24 may also operate to limit the upward angling of the upper table 4 by limiting travel of the brace 20. Preferably, the drill press table accessory is capable of being angled to at least an angle of 45° relative to the lower table 6.

A drill press table accessory of the invention may have other means for engaging the locking angel brace and thereby locking the upper table 4 at a desired angle to the lower table 6, such as a spring loaded locking member, a non-moving locking member that engages notches or steps in the angle brace, and the like. The angle brace 20 may also have a guide such as a numbered scale provided on the angle brace 20 for indicating the angle of orientation of the two tables 4 and 6 to one another. It is noted that the angle brace 20 comprises an elliptical shape so that its end remains below the work surface 5 regardless of the orientation of the upper and lower tables 4 and 6 to one another. This helps to prevent the angle brace 20 from interfering with a work piece that may be overhanging an edge of the work surface 5.

The drill press table accessory 2 further has a fence 50 for engaging a work piece, with the fence 50 movable along two tracks 52 in the work surface 5. Preferably, the tracks 52 are proximate and substantially co-extensive with the two lateral sides 26 and 28 of the upper table 4. The fence 50 has track engagement members such as the fence locking bolts 56 for engaging the tracks 52 and for locking the fence in place. The tracks 52 preferably comprise T tracks, with the locking bolts 56 comprising a carriage bolt configuration for releasably engaging the T tracks. With the preferred track 52 placement substantially parallel to the lateral sides 26 and 28 of the upper table 4, the fence 50 remains substantially parallel to the front edge 18 of the work surface 5.

Figure 3:
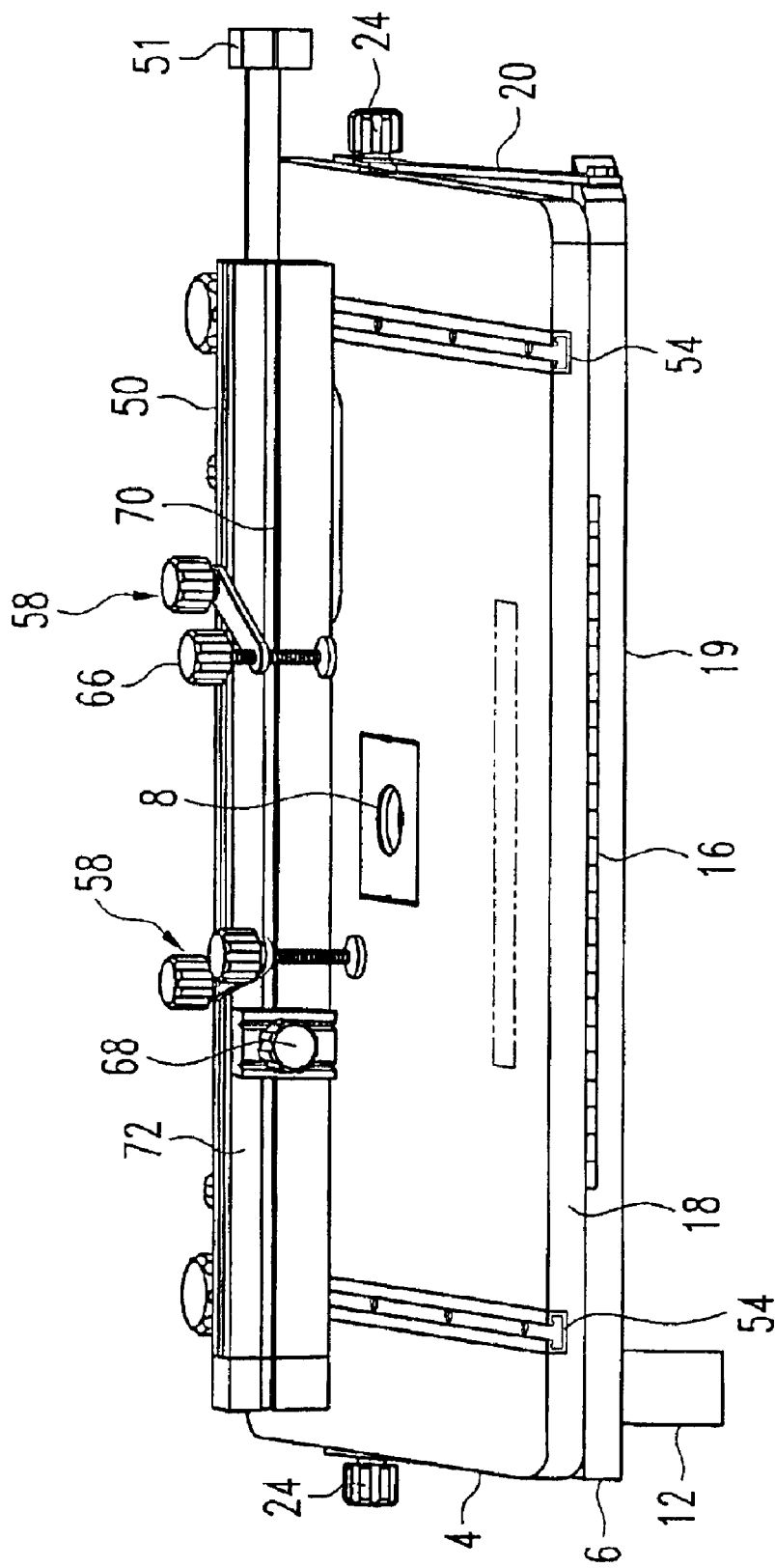
FIG. 3 is an additional perspective of the first embodiment.
Figure 4:
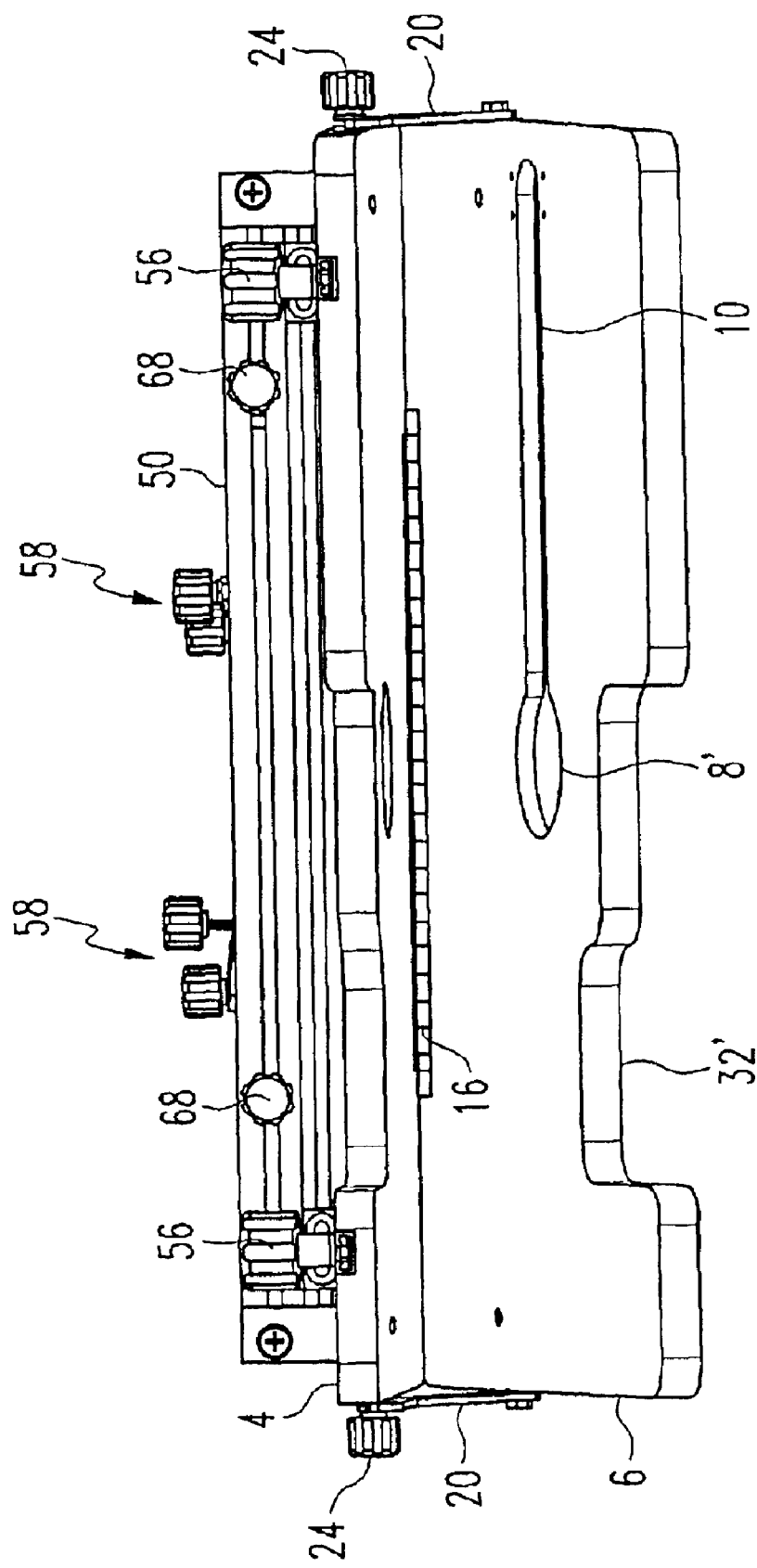
FIG. 4 is an additional perspective of the first embodiment.

One or both ends of the fence 50 may have an extension 51 that is slidably removable from the fence 50 along its major axis, as best illustrated by FIG. 3. When removed, the extension 51 allows for work pieces that may have one or more dimensions larger than the work surface 5 to be held. Preferably a stop is located at the end of the extension 51.

The drill press table accessory 2 further comprises a plurality of clamps 58 connected to the fence 50. The fence 50 has a fence slot 60 along its top edge, with the clamps 58 having a pivotal clamp end 62 movable along the length of the slot 60. A clamp arm 64 is pivotally connected to the clamp end 62 and has a distal end threadably holding a work piece engagement member 66 for engaging the work piece. The pivotal clamp end 62 is lockable in the slot 60 to hold the clamp 58 in place along the slot 60, and also to hold the clamp arm 64 from pivotal movement. Preferred means of locking comprise threaded tightening, although other means such as spring loading and the like may also be used. The work piece engagement member 66 may be tightened downward against a work piece to thereby hold the piece on the work surface 5.

The fence 50 also has at least one stop 68 movable along its length in a stop track 70 for engaging the work piece. The stop 68 is preferably lockable in place at a desired position along the length of the fence 50. Example locking means comprise a threaded connection to an adjustable knob 69 extending on an opposite side of the stop slot 70. Preferably the stop 68, clamp engagement members 66, and engaging portions of the fence 50 have a pliable surface portion for contact with the work piece so as to be able to firmly engage the piece without marking or damaging it. A preferred pliable surface portion comprises a rubber or rubber-like polymer pad.

In cooperation with one another, the fence 50, stop 68, and clamps 58 may be used to engage and hold a work piece in place on the work surface 5 for operation on by a drill. It will be appreciated that the configuration of the fence 50, tracks 54, clamps 58, and stop 68 provide advantageous capabilities for engaging a variety of work pieces that may be oddly shaped or otherwise difficult to engage.

Figure 2:
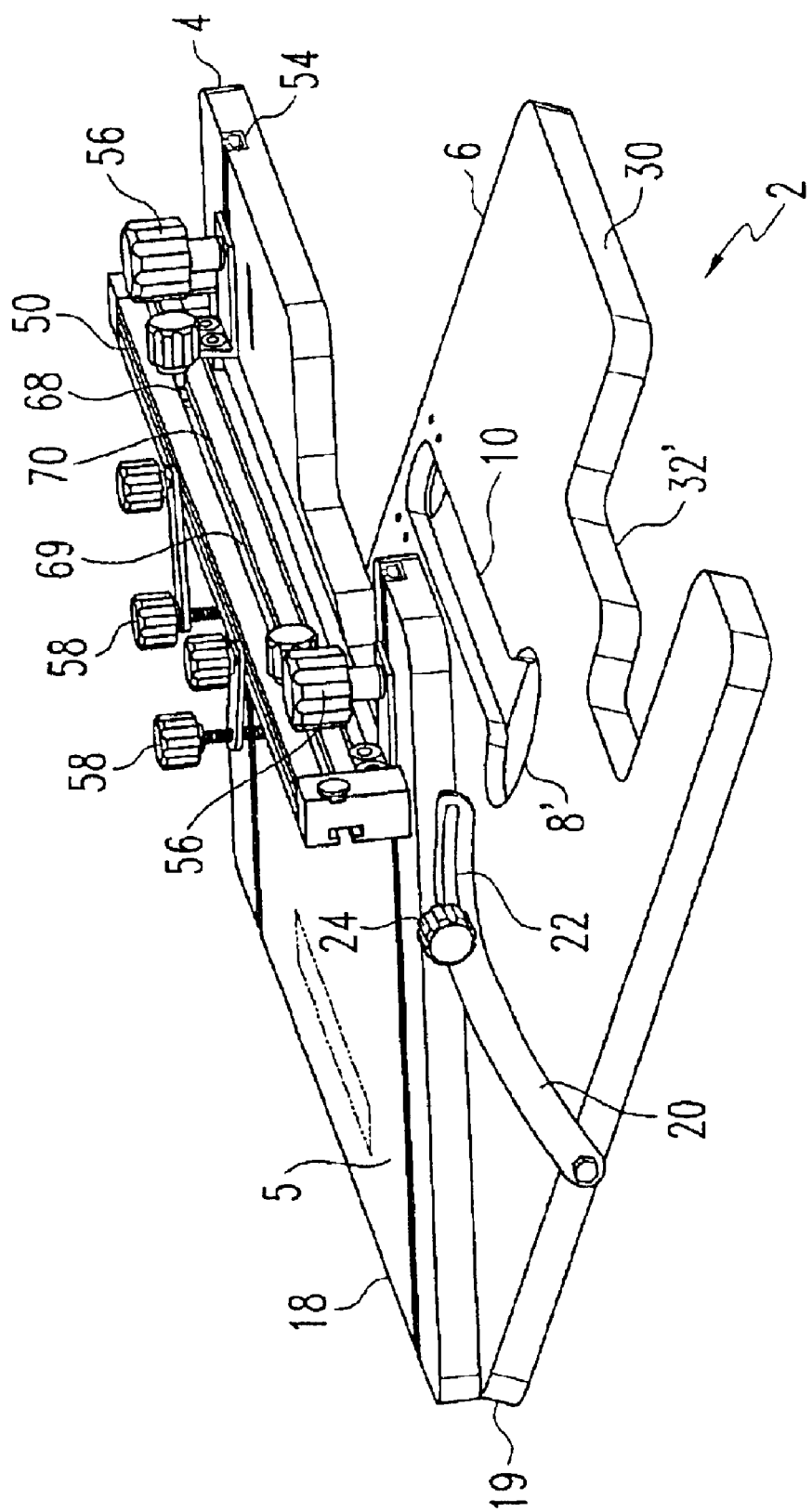
FIG. 2 is an additional perspective of the first embodiment.

The fence 50 may advantageously be placed in a forward or rear facing orientation. The fence 50 has a front side 72 that the stop 68 moves along and that the clamps 58 are used to hold the work piece proximate to. As illustrated in FIG. 1, the fence front side 72 is facing away from the table front edge 18 and towards a rear edge 30. The fence 50 may be removed from the table 2 by disengaging the fence locking bolts 56 from the tracks 54 at their open ends. Once removed, the fence 50 can be rotated 180°, and placed back into the tracks 52 so that its front side 72 now faces the front edge 18, as shown in FIGS. 2–3. This may be advantageous, for example, when operating the table at an angle wherein it is desired to hold the work piece from above (i.e., the fence 50 towards the rear edge 30 of the work surface 5 with the clamps 58 operating towards the front edge 18).

It will be appreciated that a drill press table accessory of the invention is for use with a drill press. Accordingly, an invention embodiment may comprise a drill press having a drill press table accessory that is generally consistent with the table embodiment 2. Such an invention embodiment may comprise, in addition to a drill press table accessory of the invention, a substantially vertical column with a drill chuck at an upper end of the column. The drill chuck is for holding a drill bit, and may be adjustably moved vertically towards or away from the drill press table to drill a work piece. A motor may further be comprised for providing rotational torque to the chuck.

With reference to the drill press table accessory 2 of FIGS. 1–3, the upper table 4 and lower table 6 have a cutout 32 and 32', respectively, along their rear edges shaped to accommodate the vertical column and the quill feed crank of a drill press. The lower table 6 also may have a plurality of slots that extend through it for receiving one or more bolts to attach the table to a drill press. For example, a drill press may be provided with a basic table having slots or holes for receiving a fence or the like. The lower table 6 may be attached to this basic table by inserting bolts through the lower table slots, through the drill press basic table slots, and through a locking nut below the basic table.

Figure 5:
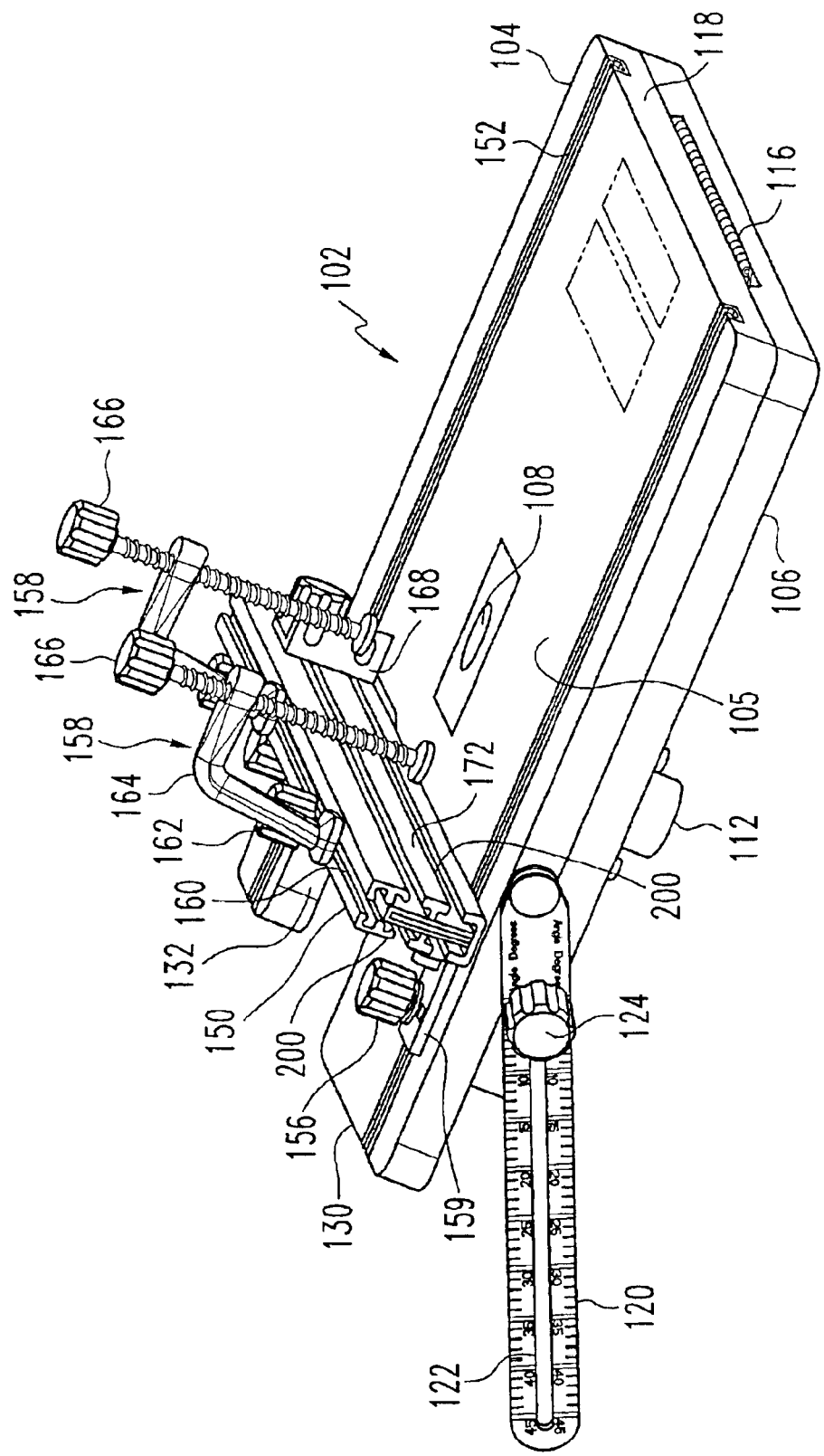
FIG. 5 is a perspective of a second embodiment of the present invention.

FIG. 5 is a perspective of a second embodiment of a drill press table accessory of the invention. The drill press table 102 shown in FIG. 5 is similar in many respects to the drill press table 2 of FIGS. 1–4. Element numbers of the table accessory 102 have been assigned a 100 prefix in FIG. 5 with respect to similar elements of the table embodiment 2 for convenience. Generally, the drill press table accessory 102 comprises an upper table 104 hingedly attached to a lower table 106. An opening 108 in the work surface 105 of the upper table 104 is substantially coextensive with an opening in the lower table 106 (not illustrated) when the two tables are in place as illustrated in FIG. 6. The lower table 106 has a vacuum channel that communicates a pressure differential from a vacuum source connected to the vacuum port 112 to the openings to remove debris from the area.

The drill press table accessory 102 has an angle brace 120 that is pivotally connected to the upper table 104 with a locking member 124 connected to the lower table 106. This configuration may be desirable as it can be practiced with a substantially straight angle brace 120 while retaining the brace 120 below the plane of the upper table work surface 105 regardless of the orientation of the upper and lower tables 104 and 106. Other angle brace configurations may likewise be comprised, with examples comprising a hydraulic assembly and a gear drive assembly.

The drill press table accessory 102 also has a fence 150 and a plurality of clamps 158 that are configured somewhat differently than those of the drill press table accessory 2. As illustrated, the fence 150 comprises a plurality of T tracks 200 along its front side 172 and rear side 174. The stop 168 moves along the tracks 200 on the fence front side 172, and has means such as a threaded locking bolt for locking it in position along the track 200. The fence engagement members 156 for locking the fence 150 along the table tracks 152 are attached to a generally L shaped bracket 159 that connects to the fence 150 along one or more of the tracks 200. The clamps 158 of the table embodiment 102 move along the fence slot 160, and are lockable in place along the slot 160 using the threaded clamp end-locking member 162. The slot 160 preferably comprises a T track. A clamp arm 164 extends from the clamp end 162 to threadably receive a work piece engagement member 166 for holding a work piece against the work surface 105. Like the fence 50 of the table 2, the fence 150 of the table 102 is reversible in orientation so that its front side 172 may be oriented towards the front edge 118 or the rear edge 130 of the upper table 104.

It will be appreciated that the dimensions of a drill press table accessory of the invention may vary according to, for example, the scale of the drill press for which the table will be used. By point of reference, one embodiment of a drill press table accessory of the invention has a work surface with dimensions of about 24"×16". This scale has been found to be useful with some commercially available drill presses. It will also be appreciated that an additional advantage of a drill press table accessory of the invention is that a large work surface may be achieved. That is, through use of a drill press table accessory of the invention, a user may significantly increase the available work surface for holding a work piece as compared to the drill press basic table.

It will be understood that although discussion has been made herein regarding example drill press table accessory embodiments, such discussion has been made only for the purpose of illustrating example invention embodiments and shall not be considered to limit the scope of the invention. Other invention embodiments will of course be possible. For example, the drill press table accessories discussed and shown have upper and lower tables hingedly attached to one another in addition to a vacuum channel. It will be appreciated that other invention embodiments may comprise a drill press table with only a vacuum channel (i.e., without hingedly attached upper and lower tables), or may comprise a drill press table with only hingedly attached upper and lower tables (i.e., without a vacuum channel).

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A drill press table accessory for holding a work piece for drilling, the drill press table accessory comprising:
   a work surface for holding the work piece;
   an opening through said work surface for passing at least a portion of a drill bit; and,
   a vacuum channel communicating with said opening and communicating with a vacuum port for connection to a vacuum source.

2. A drill press table accessory as defined by claim 1 wherein said vacuum port comprises a substantially cylindrical shaped connector tube for connection to a vacuum hose, said vacuum port extending from a bottom surface of the table.

3. A drill press table accessory as defined by claim 1 wherein the table further comprises an upper table and a lower table, a top surface of said upper table defining said work surface, wherein said opening extends through said upper and lower tables, wherein said vacuum channel comprises a channel along a top surface of said lower table, said channel thereby enclosed when said upper table is adjacent said top surface of said lower table, and wherein said vacuum port extends from a bottom surface of said lower table.

4. A drill press table accessory as defined by claim 3 wherein said upper and lower tables are pivotally connected to one another by a hinge and at least one angle brace, said at least one angle brace operable to selectively lock said upper table in pivotal position relative to said lower table.

5. A drill press table accessory as defined by claim 4 wherein said upper table is pivotal over at least about 45° relative to said lower table.

6. A drill press table accessory as defined by claim 4 wherein said at least one angle brace comprises an arm pivotally connected to one of said upper or lower tables, said arm having a locking slot, said other of said upper or lower tables comprising a locking member for releasably engaging said locking slot to hold said upper table at a desired position relative to said lower table.

7. A drill press table accessory as defined by claim 3 wherein said lower table further comprises a plurality of slots for receiving a plurality of bolts, said bolts for attaching said lower table to a drill press basic table.

8. A drill press table accessory as defined by claim 1 wherein the accessory further comprises a fence movably connected to said work surface, and a plurality of clamps connected to said fence for holding the work piece.

9. A drill press table accessory as defined by claim 8 wherein said work surface comprises a plurality of tracks, and wherein said fence comprises a plurality of track engagement members for movably engaging said tracks whereby said fence is movable along said tracks, said engagement means lockable within said tracks.

10. A drill press table accessory as defined by claim 9 wherein said work surface comprises two lateral sides, a front edge, and a rear edge, said rear edge comprising a cutout for passing a vertical drill press column, and wherein said plurality of surface tracks comprise two surface tracks, one each of said two surface tracks substantially coextensive with one each of said lateral edges wherein said fence is movably held substantially parallel to said work surface front edge, said tracks open at at least one of said front or rear edges.

11. A drill press table accessory as defined by claim 8 wherein said fence comprises a front and a rear side, and wherein said plurality of clamps are connected to said fence for clamping the work piece proximate to said fence front side, said clamps movable along the length of said fence along a fence slot in a top side of said fence.

12. A drill press table accessory as defined by claim 11 wherein each of said clamps comprises a clamp end movably engaging said fence slot and lockable therein, each of said clamps having a clamp arm extending from said pivotal end, and each of said clamps having a work piece engaging member at a distal end of each of said clamp arms for engaging the work piece.

13. A drill press table accessory as defined by claim 8 wherein said fence further comprises at least one fence extension for extending the length of said fence beyond an edge of said work surface, and wherein said fence further comprises at least one stop movable along the length of said fence and lockable along said fence.

14. A drill press table accessory as defined by claim 1 wherein the drill press table accessory is connected to a drill press, said drill press comprising a substantially vertical column, a motor, and a drill chuck supported on said column over said table work surface, said chuck for holding a drill bit, said chuck vertically movable towards and away from said work surface, said motor for rotating said chuck.

15. A drill press table accessory comprising:
an upper table having a work surface, a first opening extending through said upper table for receiving at least a portion of a drill bit, a fence movable along said work surface, a plurality of clamps movable along said fence, said clamps for holding a work piece, said upper table having a front edge, a rear edge, and two lateral edges, a cutout along said rear edge for receiving a drill press column;
a lower table connected to said upper table by a hinge, said lower table having a front edge, a rear edge, and two lateral edges, said lower table connected to said upper table along respective of said front edges, said upper table pivotally movable relative to said lower table, a second opening extending through said lower table and substantially coextensive with said first opening when said upper table is located on top of said lower table;
a pair of angle braces connecting said upper and lower tables, one each of said pair of angle braces pivotally connecting said lateral edges of said upper and lower tables, each of said angle braces having a locking slot and a calibration scale adjacent to said locking slot, a locking bolt threadably connected to a lateral edge of one of said upper or lower tables for engaging said locking slot to lock said upper table in a desired position relative to said bottom table, said calibration scale cooperating with said locking bolt to indicate an angle of orientation of said upper and lower tables to one another; and,
a vacuum channel in an upper surface of said lower table, said vacuum channel having a first end terminating in said second opening, having a second end terminating in a vacuum port on a bottom surface of said lower table, said vacuum port for connection to a vacuum source.

16. A drill press table accessory as defined by claim 15 wherein:
said fence is movably held along two tracks in said upper table work surface, said fence substantially parallel to said upper table front edge, one each of said two tracks proximate and substantially coextensive with one each of said upper table lateral edges, said fence having a front side and a rear side, said plurality of clamps for clamping a work piece proximate to said fence front side, said fence able to be placed in said tracks in a first or a second orientation, said fence front side facing said upper table front edge when said fence being in said first orientation and said fence front side facing said table rear edge when said fence being in said second orientation.

17. A drill press table accessory comprising:
an upper table having a work surface, a first opening extending through said work surface, a plurality of tracks in said work surface, a fence having engagement members movable along said tracks, said engagement members for locking said fence in position along said tracks; and,
a lower table connected to said upper table by a hinge and at least an angle brace, said upper table pivotally movable relative to said lower table over an angle of at least about 45°, locking means for engaging said at least an angle brace to lock said upper table in a desired pivotal position relative to said bottom table, a second opening extending through said lower table and substantially coextensive with said first opening when said upper table is adjacent to said lower table.

18. A drill press table accessory as defined by claim 17 wherein said drill press table is for attachment to a drill press having a vertical column, and wherein said upper table having a rear edge, said rear edge having a cutout for receiving said vertical column, wherein said hinge is located along a front edge of said upper and lower tables opposite said rear edge, and wherein said angle brace comprises a pair of angle braces, one each of said pair of braces located along a lateral side of said upper and lower tables, each of said angle braces being pivotally connected to one of said upper or lower tables, each of said angle braces having a locking slot and a calibration scale along said locking slot, and wherein said locking means comprise a locking bolt threadably received in a lateral side of the other of said upper or lower tables for engaging said locking slot, said locking bolt cooperating with said calibration scale to indicate an angle of orientation of said upper table to said lower table.

19. A drill press table accessory as defined by claim 18 wherein said angle brace remains below the plane of said upper table working surface when said upper table is in a lowered position on top of said lower table.

20. A drill press table accessory as defined by claim 17 wherein said tracks extend parallel to said lateral edges of said upper table, wherein said fence has a front side and further comprises a plurality of clamps for clamping a work piece proximate said fence front side, said fence comprising a top slot for movably engaging said clamps, said fence comprising a track along its front side, a stop movable along said track, and wherein said fence may be disengaged from said work surface tracks, rotated 180°, and re-engaged with said work surface tracks, whereby said fence front side may be oriented towards a front or a rear edge of said work surface.

* * * * *